United States Patent
Currie et al.

[11] 3,787,668
[45] Jan. 22, 1974

[54] ADAPTIVE THRESHOLD UNIT

[75] Inventors: Richard W. Currie; Teddy J. Peacher, both of Huntsville, Ala.

[73] Assignee: The United States of America as represented by the Secretary of the Army

[22] Filed: Feb. 22, 1973

[21] Appl. No.: 334,826

[52] U.S. Cl............ 235/152, 250/220 M, 250/83.3
[51] Int. Cl.......................... G06f 7/38, G06f 15/34
[58] Field of Search ......... 235/152, 177; 340/146.2; 250/334, 336, 342, 345, 203, 208, 220 M, 209, 83.3; 315/10; 244/3.16

[56] References Cited
UNITED STATES PATENTS

| | | | |
|---|---|---|---|
| 3,564,257 | 2/1971 | Berry et al....................... | 250/342 X |
| 3,495,086 | 2/1970 | Scott................................... | 250/209 |
| 3,214,574 | 10/1965 | Landsman et al.............. | 250/220 M |

*Primary Examiner*—Malcolm A. Morrison
*Assistant Examiner*—James F. Gottman
*Attorney, Agent, or Firm*—Edward J. Kelly; Herbert Berl; Jack W. Voigt

[57] ABSTRACT

In conjunction with an infrared detection device, the adaptive threshold unit eliminates much of the clutter or false targets in the field of view of the detection device. This is accomplished by converting received analog intensities which represent the true target and clutter into digital form and processing them in a special purpose digital processor. The digital processor passes target or possible target pulses only from those field of view segments which have a higher intensity than the average intensity of the eight surrounding segments. Each segment of space subtends a one milliradian by one milliradian angle and each segment of the sector being viewed is periodically compared with the surrounding segments.

6 Claims, 2 Drawing Figures

ADAPTIVE THRESHOLD UNIT

SUMMARY OF THE INVENTION

In the field of detection and acquisition of aircraft targets the adaptive threshold unit is utilized as part of an infrared aircraft detection system. This particular embodiment has 28 detectors arranged in a vertical line behind a typical Schmidt optical system. The optical unit is rotated at a one revolution per second rate, continuously scanning a circular path in azimuth. Each detector output drives a preamplifier. The preamplifier outputs are sampled with a multiplexer system at a rate which gives a complete vertical scan during each 1 milliradian of azimuth rotation. The detectors each subtend a 1 milliradian by 1 milliradian projected solid angle. Thus, the scan rate effectively breaks up the field of view into 1 milliradian by 1 milliradian segments which are scanned in a fixed sequential manner. The repetitive sequential scan and single video signal out of the multiplexer facilitates signal processing of the adaptive threshold unit. The adaptive threshold unit eliminates significant portions of clutter normally present in associated video cathode ray tube display, thereby allowing the human operator of the system to more easily identify targets in the field of view of the detection system. Eliminating false targets also unburdens the detection system's automatic tracking computer by reducing clutter inputs from the threshold unit which overload the memory.

BRIEF DESCRIPTION OF THE DRAWINGS

In detection and acquisition systems wherein selected sectors of space are continuously monitored in search of aircraft targets, signal intensity levels across the sector being observed are often graphically displayed before a human operator for discernment of targets. Thus in a Schmidt optical system energy is coupled for review by an operator. In conjunction with the optical scanning system and as set forth in FIG. 1 infrared detectors 1a through 28a are arranged in a vertical line for receiving infrared optical energy as the scanning unit moves in azimuth, thus sweeping out the field of view of the system in a sequential or serial fashion. Analog output signals from the infrared detectors are coupled to respective preamplifiers 1b through 28b for amplification. These signals are then coupled to a multiplexer 70. Output signals from multiplexer 70 are coupled to an analog to digital converter 72 wherein the analog output of the multiplexer is converted to digital bits for respective detector segments. Converter 72 has six output trunks connected in parallel to respective shift register delay lines A, B, C, D, E, and F. Each of the shift register delay lines are serial lines 67 bits long. The most current or instantaneous word introduced into the delay lines is indicated as the zero or initial input position with the remainder of the segment positions being numbered 1 through 66. Output taps along the respective delay lines are coupled to the 0, 1, 2, 32, 33, 34, 64, 65, and 66 positions of each line. The digital word bit, A, B, C, D, E, F, for the respective delay lines tapped positions 33 are coupled to a comparator circuit 74. The remaining tapped outputs are summed in a series of digital adders in any convenient manner for averaging the sum. As shown, the digital bits A, B, C, D, E, F for positions 0 and 1 are summed in an adder 76. Similar word bits for positions 2 and 32 are summed in an adder 77, positions 34 and 36 are summed in an adder 78, and positions 65 and 66 are summed in an adder 79. Outputs from these digital summing circuits each have or may have an additional digital value G. Thus the digital outputs of adders 76, 77, 78, and 79 may be a 7 bit word A, B, C, D, E, F, G. The outputs of adder 76 and 77 are coupled as respective inputs to an adder 82 and the outputs of adders 78 and 79 are coupled as inputs to an adder 84. The respective outputs of adders 82 and 84 may also comprise an additional digital bit, providing an eight bit word A, B, C, D, E, F, G, H output. These outputs are coupled as inputs to the third and final summing level, digital adder 86. The result of the sum within adder 86 is mathematically divided by eight, the number of input words, to form the average threshold value for tap 33. The division by eight is accomplished by dropping the three least significant bits of the sum word using methods well known in processing digital words. Assuming the least significant bits to be the output signals from delay lines A, B, and C, the output of adder 86 comprises D, E, F, G, H, and J, which is coupled to comparator 74. The summed words A, B, and C are dropped or discarded. The output of digital adder 86 provides the threshold level signal against which the output words from taps 33 are compared. This threshold level for tap 33 is momentarily established for each word passing through position 33 and the signal level for tap 33 is digitally compared against it in comparator 74. An output from the adaptive threshold comparator occurs and is gated out as a digital 1 when the tap 33 signal is larger than the average value of the eight surrounding signals. An output from multiplexer 70 is coupled directly to gate 88 providing a blocking signal when digital data respecting detectors 1 and 28a are aligned in delay line positions 1, 33, and 66.

Obviously, timing pulses are provided from a high frequency clock source to appropriate circuit elements for maintaining uniformity of operation of the various elements of the adaptive threshold circuit and related input circuitry. The capability of providing timing pulses is well established in the art and is therefore not shown on the drawings. In response to each timing pulse data bits stored in respective shift register delay line elements are advanced to the next succeeding element stage.

Figures 1, 2:
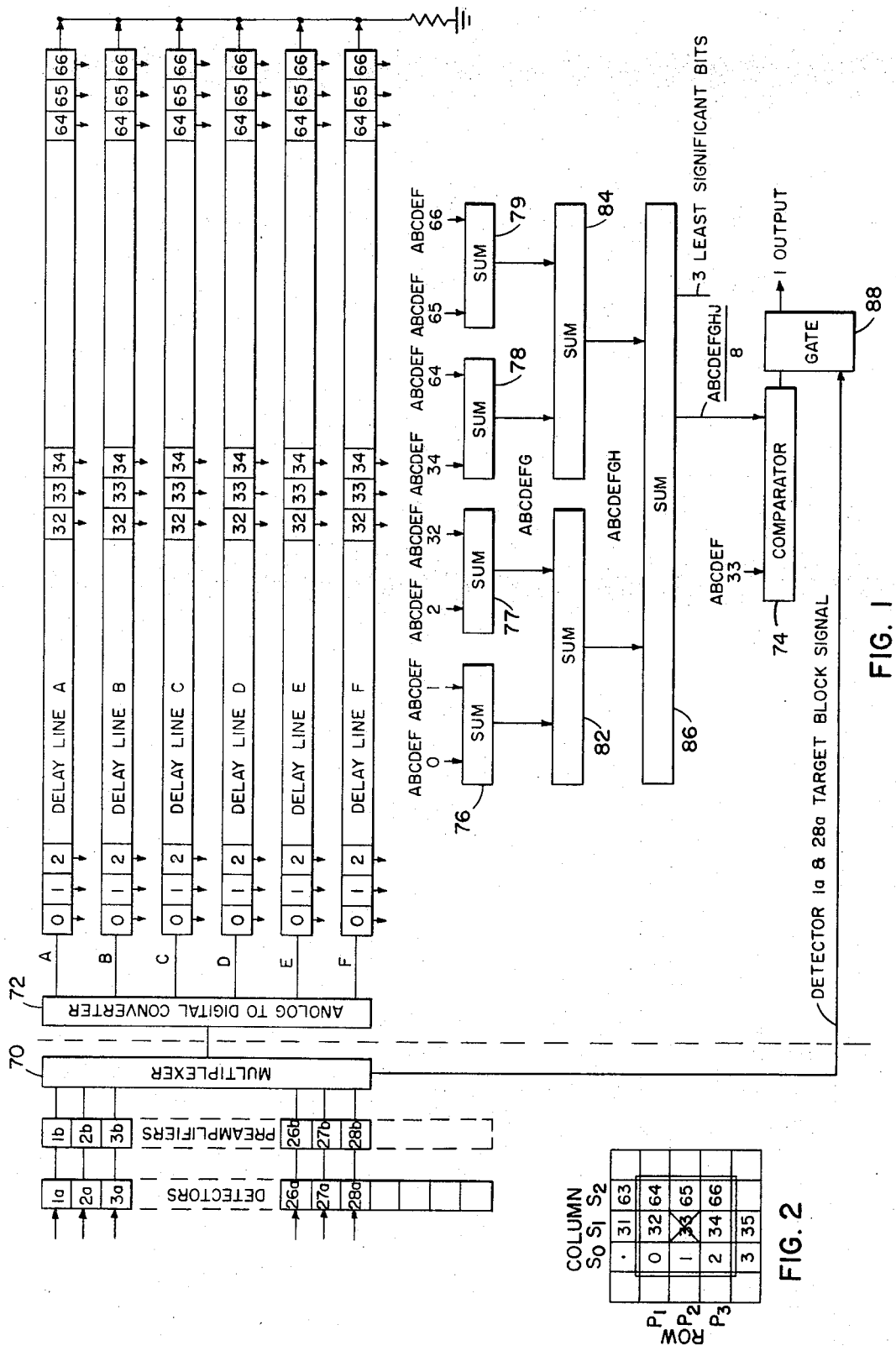

Since operation of the parallel delay lines is identical, signal processing for delay line A is representative of associated delay lines B, C, D, E, and F. Thus, a timing pulse is introduced to the appropriate elements of the adaptive threshold circuit to prepare the system for the upcoming data bits. Each of the 67 storage elements of delay line A are gated by the timing pulse or clock signal (not shown) and the data bits stored in respective storage elements are advanced to the succeeding stages. The most current bit entered into the delay line is entered at the 0 storage unit. Data bits being advanced from storage unit 66 have no further useful function and are dropped from the delay lines. As each bit advances through the delay line a digital map is being formed. For this particular embodiment having 28 analog input segments and four blank input segments, there are 32 delay line positions involved before the system repeats its vertical scan.

For an instantaneous data bit in the 0 position, the bit lying in storage unit 32 corresponds to the adjacent azimuth position or sector of space observed on the preceeding vertical scan of multiplexer 70 across the respective detector outputs. Similarly, advancing 32 positions, the data momentarily stored in position 64 corresponds to the next previous azimuth signal and space. Thus these three data storage positions provide the three most current data sweeps of a particular segment of space. Data respecting the vertical segment of space, which was received immediately preceeding the instantaneous or 0 position, is stored in storage position 1, with positions 33 and 65 containing similar data sweeps of adjacent azimuth segments of space. Similarly, data in storage positions 2, 34 and 36 provide digital data of 3 successive sweeps of the multiplexer across detectors measuring signal intensity in adjacent azimuth segments of space.

The six delay lines A, B, C, D, E, and F each receive a digital bit for each vertical segment scanned. These six bits form a digital word. Thus, the analog video signal for each segment of space monitored is converted to a six bit digital word by high speed converter 72. The digital word feeds the six parallel shift register delay lines simultaneously. The delay lines are clocked simultaneously so the bits progress through the lines at equal, discrete increments. Each delay line, being 67 bits long, allows temporary storage of three successive sweeps of the multiplier, thereby providing access to the three adjacent segments of space in azimuth and elevation. By continuously examining these nine selected word positions after each clocked advancement of the delay line words, each segment of space (1 milliradian by 1 milliradian) being observed is compared with the vertical and horizontal positions surrounding it as the scanning head revolves.

In FIG. 2 these respective six bit words are shown in columns and rows. Columns $S_0$, $S_1$, and $S_2$ show the respective instantaneous scan ($S_0$), first previous scan ($S_1$), and second previous scan ($S_2$). Each numbered segment represent a six bit word for that storage unit. Data on row $P_1$ represents adjacent azimuth segments in space for three successive vertical scans of the multiplexer while the scanning device has advanced through three milliradians of azimuth rotation. Rows $P_2$ and $P_3$ also provide adjacent segments. Obviously, storage position 33 represents the central segment of three vertical segments and the central segment of three azimuth sweeps. The word momentarily in position 33 can be compared with the average of the adjacent words in positions 0, 1, 2, 32, 34, 64, 65, and 66 to determine whether or not the signal level of position 33 is sufficient to indicate a true target in that sector.

Thus, the adaptive threshold unit receives a single line video signal train with timing pulses introduced between segments of the train. Each video segment (1 timing pulse period) represents the intensity of a 1 milliradian by 1 milliradian segment of the field of view of the scanning head. Signals are multiplexed in such a way that the video represents the scan down a vertical line for 28 detector segments. Then a blank of four segments is inserted allowing time for retrace, reset and readout purposes. This operation continuously sweeps down the vertical detectors as the unit moves in azimuth, thus sweeping out the field of view of the system in a sequential or serial fashion. Each analog video segment is converted to a six bit digital word with the high speed, analog to digital converter 72. The six bit digital words coupled to respective delay lines provide a temporary memory which forms a map of the intensities received for those elements in three previous scans of the multiplexer sweep. The threshold for element 33 (taps 33 in the delay line memory) is established by averaging the signal levels in the eight surrounding elements. An output from the adaptive threshold circuit occurs when the tap 33 signal is larger than the average value of the eight surrounding locations.

Obviously the adaptive threshold circuit will function with any number of detectors. An adjustment in the lengths of the delay lines and respective delay line taps is required to implement variations in the adaptive threshold circuit. The number of bits per word can also be varied to achieve the desired accuracy and precision in the setting of the adaptive threshold system. The system is also applicable to single detector raster scanning methods where, with the proper timing and delay lengths, a continuous map of the field of view could be established and the threshold for each element adjusted based on the data stored in this map. For the specific embodiment, the method of setting a detection threshold by examining the surrounding spatial segments does not work properly for end detectors 1a and 28a. When examining the array ends a no signal condition results and is summed for three of the nine spatial segments. These spatial segments are those which would be occupied by analog detectors 0 and 29 if the 28 element array was extended at both ends or by detectors 0 and N+1 for an array of N detectors. The zero signal for these particular spatial segments will cause a false target condition to persist any time the end detector's output is greater than the output of the remaining five active spatial segment signals summed and divided by eight. This can be corrected by summing the five active segment signals and dividing by five for the end conditions or by other similar processing means if desired. The simplest approach is to allow the end detectors to contribute to the threshold establishment for detectors 2a and 27a but not to operate as target detectors. Therefore, as shown in FIG. 1, to eliminate false targets from these end detectors a pulse is generated from the vertical timing signal when the end detectors are examined. This inhibit pulse is coupled from multiplexer 70 to gate 88 and utilized to block output of false target conditions from the comparator.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. An adaptive threshold system for converting selected analog signals into digital form and comparing respective digital signals with the average signal level of subsequent and preceeding digital signals, and comprising: an analog to digital converter having an input for receiving periodic input signals and converting said signals to digital words, and having a plurality of outputs for coupling out said words; a plurality of parallel shift register delay lines having respective inputs coupled to said converter outputs for simultaneously receiving sequential bits of digital words coupled thereto and having selected tapped output positions for coupling out preselected digital word bits, a digital adding network having plural inputs coupled to selected of said tapped outputs for receiving, summing, and averaging said bits, and an output for coupling out the summed average of said plural inputs; and a comparator circuit having a first input coupled to sequentially receive a single word from a first of said tapped outputs, a second input coupled to said adding network output to sequentially receive said average sum output, and an output for coupling out an output signal when the word coupled to said first input is greater than the average word received by said second input.

2. An adaptive threshold system as set forth in claim 1 and further comprising a multiplexer having a plurality of inputs for sequentially receiving adjacent segments of an analog signal level, a first output coupled as an input to said analog to digital converter, and a second output; a gate circuit having first and second inputs and an output, said first input being coupled to the output of said comparator for gating the output signal therefrom and said second input being coupled to the second output of said multiplexer for receiving preselected inhibiting input signals.

3. An adaptive threshold system as set forth in claim 2 and further comprising a plurality of infrared detectors arranged in a column for detecting impinging energy, said detectors having outputs coupled as inputs to said multiplexer for sequential and continuous scanning by said multiplexer.

4. An adaptive threshold system as set forth in claim 3 wherein said parallel shift register delay lines are 67 bits long, sequentially from 0 through 66, with respective bit positions 0, 1, 2, 32, 33, 34, 64, 65, and 66 being tapped, tapped output 33 being the central storage position of the delay line and being coupled to said first comparator input, and said tapped bit positions forming adjacent positions of digital words corresponding to adjacent infrared detector outputs of signal intensity.

5. In a spatial tracking system wherein adjacent sectors of space are periodically scanned for aircraft and infrared optical energy is detected sequentially from adjacent sectors, the method of discerning targets within sectors of space comprising the steps of:
converting analog infrared intensities into digital words for respective segments of a spatial sector,
simultaneously coupling the bits of each digital word to respective shift registers,
advancing respective bits of each word simultaneously through respective shift registers,
sequentially and continuously coupling respective bits of incoming digital words into said shift registers while advancing previously received word bits, sequentially and continuously monitoring selected shift register positions for comparing adjacent intensity levels,
indicating a target when a selected one of said shift register positions has a signal level greater than the average signal of adjacent positions.

6. The method of discerning targets as set forth in claim 5 and further comprising monitoring selected shift register positions by the steps of:
summing the instantaneous input digital word with the first previously received word,
summing the second previously received digital word with the 32nd previously received word,
summing the 34th previously received word with the 64th previously received word,
summing the 65th previously received digital word with the 66th previously received word,
adding and averaging these summed words for providing a single average digital word, and
comparing the 33rd previously received digital word with said average digital word for obtaining an output signal indicative of target presence.

* * * * *